Patented Jan. 3, 1939

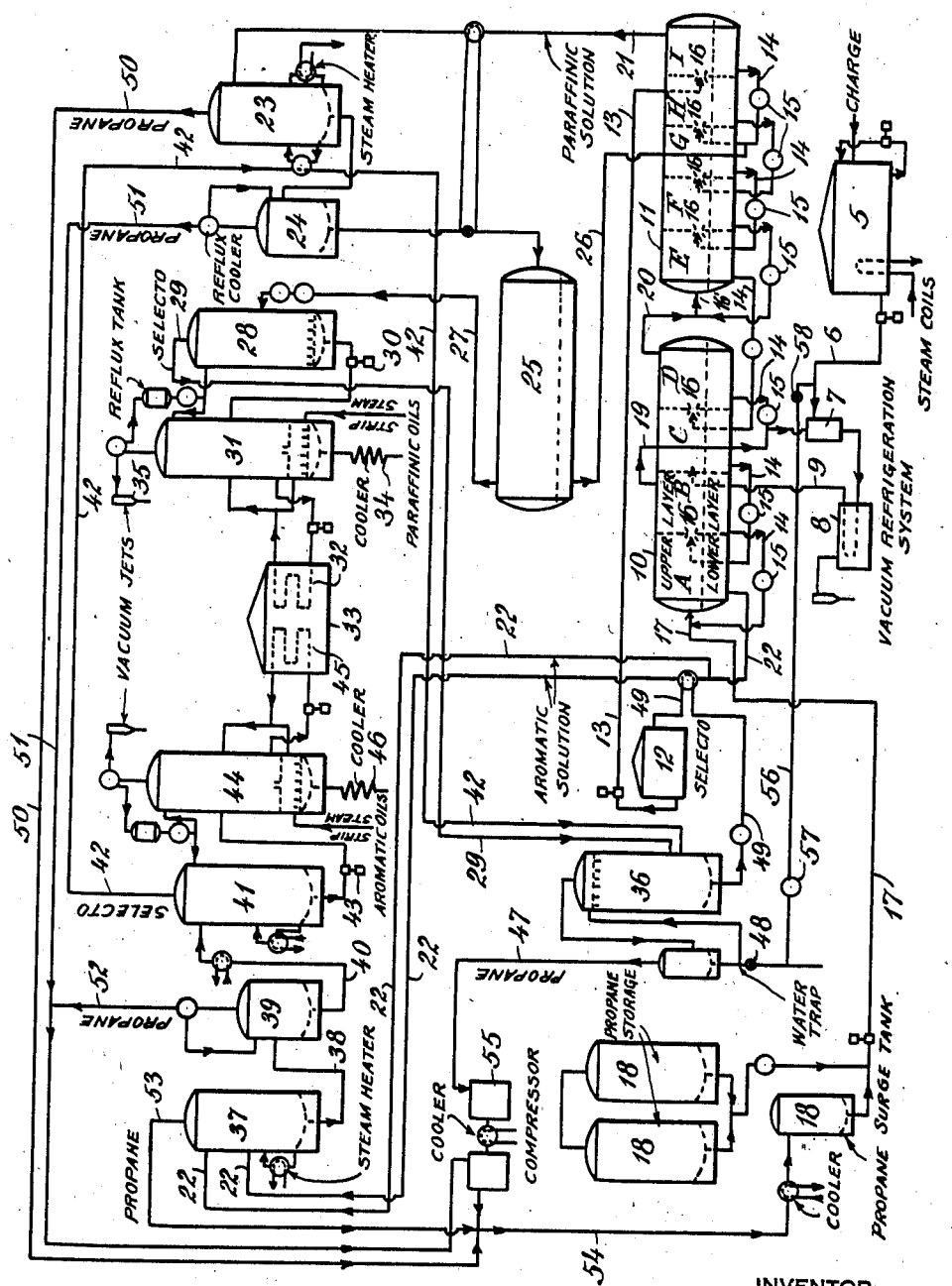

2,142,525

UNITED STATES PATENT OFFICE 2,142,525

METHOD OF TREATING OILS

Henry D. Noll, Beaumont, Tex., assignor to Socony-Vacuum Oil Company, Incorporated, New York, N. Y., a corporation of New York Application February 17, 1937, Serial No. 126,104

4 Claims. (Cl. 196—13)

This invention is directed to methods of solvent refining mineral oils to produce therefrom lubricant oil fractions of high viscosity index and low viscosity gravity constant (V. G. C.). Solvent refining is a process wherein an oil is admixed with some liquid capable of exercising preferential solvent power for one of the groups of constituents in the oil, followed by phase separation, followed by removal of the solvent and the extracted constituent group admixed therewith. Double solvent refining is that variation of the above process wherein two solvents are employed, one exhibiting preferential solvent power for the paraffinic constituents of low V. G. C. and the other exhibiting preferential solvent power for the naphthenic or aromatic constituents of high V. G. C. These two solvents are usually allowed to flow countercurrently through a series of mixing and settling stages, the oil to be treated being introduced at some stage intermediate in the series. A complete commercial operation of this type includes not only the solvent treating steps, but also the steps of separating solvents from the effluent products and the recovery of solvents and their preparation for reuse in treating. It is with a complete system of operation of this type that this invention is concerned.

A solvent reagent commonly used for the extraction of the naphthenic fraction is "Tar acid", a mixture preponderating in cresols, but containing some phenols, and commercially known as "Selector." Other common reagents for such purposes are phenolic mixtures of various kinds. In the recovery of these solvents, they are first segregated as mixtures with varying quantities of water, and the final recovery step is one of dehydration, since the "Selector" or similar reagent should be applied in the process in anhydrous form, or at least with closely controlled percentages of water. The water vapor discharge from the dewatering distillation is not free of "Selecto" but is in fact a constant boiling point mixture, containing about 6% "Selecto" and 94% water, with a slight amount of paraffinic solvent.

At the point of introducing oil into the solvent treating system, as explained in detail hereinafter, it has been found that in many cases, the addition of small amounts of water with the oil leads to a more competent control and to a more complete separation from the extract or naphthenic phase of valuable oils of paraffinic nature which should be in the raffinate phase.

This invention is based upon the discovery that if the constant boiling mixture of water and naphthenic solvent, recovered from the naphthenic solvent dehydrating step, be introduced in controlled amounts with the oil to be treated, an even greater separation of desirable oil from extract occurs than with water alone. This was not to be expected, since the concentration of "Selecto" in this constant boiling mixture is low, and its presence, increasing the amount of naphthenic solvent at the point of its introduction, would be expected to increase the amount of extracted oil.

In order to more clearly understand this invention, reference is made to the drawing attached hereto. The single figure of this drawing shows in diagram form a commercial setup for the practice of double solvent refining, and in addition thereto, operative connections for the practice of this invention.

Referring to the drawing, the method of operation is as follows: Raw oil to be treated, stored in tank 5, passes through pipe 6 to mixer 7, where it is mixed with materials later described, thence through cooler 8 and pipe 9 to enter chamber B of extractor 10. Extractors 10 and 11 are composed respectively of successive chambers A, B, C, D and E, F, G, H, I, and may be separate as shown, or combined in one body. Each chamber is a settling space wherein phase separation may occur between the raffinate phase, composed of paraffinic oil plus paraffinic solvent, and the extract phase composed of naphthenic oil and naphthenic solvent. Naphthenic solvent, hereinafter spoken of as "Selecto", usually a mixture of cresylic and similar tar acids, originates in tank 12, and passes through pipe 13 to enter chamber I, wherein, after contact with oil, it becomes extract. Thereafter, the extract moves through the settling chambers in reverse order, being withdrawn from each chamber by a pipe 14, in which there is a pump 15, and introduced into the preceding chamber as the jetting medium in a jet mixing device 16 which is so mounted as to entrain raffinate layer from the preceding chamber. The only variants from this setup are in chamber I where the jet is fed by pipe 13, between chambers B and C where the jet mixer is replaced by an external mixer to permit of cooling after mixing, before chamber E, where the mixer is replaced by a pipe section 16' having the same function as 16, and before chamber A, where extract is pumped into pipe 17. The paraffinic solvent, usually liquid propane, and hereinafter referred to as propane, originates in tank 18, and passes through pipe 17 to enter chamber A, where, after contacting with and separating from extract, it becomes known as raffinate, which raffinate proceeds through chambers A to I in order by means of mixers 16 and pipes 19 and 20. In the operation thus described the oil introduced at 6 is separated into a paraffinic raffinate phase containing propane and some "Selecto" which emerges from the extraction system by pipe 21, and a naphthenic extract phase containing "Sellecto" and some propane which emerges by pipe 22. Raffinate phase emerging through pipe 21 passes to columnar steam still 23 where it is freed of a major proportion of its propane, through columnar still 24, where it is substantially freed of propane, and into settler 25, where because of change in partition effects brought about by temperature change and freedom from propane, an extract phase may settle out, to be returned by pipe 26 to chamber H as shown, or to any other chamber indicated by the nature of the settled extract. The raffinate phase from settler 25 consisting of paraffinic oil and "Selecto" passes through pipe 27 to columnar still 28, where it is freed of a portion of "Selecto", which passes off through pipe 29, and the bottoms pass through pipe 30 to columnar still 31 which is heated by circulation through pipe coil 32 placed in a fired furnace 33. Paraffinic oils, freed of solvents are recovered at 34. Still 31 is operated under vacuum induced by jet pump 35 and the overhead therefrom, containing "Selecto" is condensed and returned to still 28 as reflux as shown. The "Selector", containing a litle propane and much water, proceeds by pipe 29 to still 36, later described. The extract phase composed of naphthenic or aromatic oil, "Selecto", and some propane proceeds from the extractor through pipe 22 to still 37, provision being made to introduce it at two or more levels. Still 37 serves to remove much of the propane from this extract, whereupon extract passes through pipe 38 to still 39 for substantially complete removal of propane. From 39, extract, now consisting only of oil and "Selecto", passes through pipe 40 to still 41, where "Selecto" is removed, leaving through pipe 42, the oil flowing through pipe 43 to still 44 for complete removal of "Selecto", 44 being heated by circulation through coils 45 in furnace 33. Still 44 is operated under vacuum in the same manner as still 31. Naphthenic or aromatic oils, solvent free, are removed from the system at 46. "Selecto" gathered from still 41 passes through pipe 42 to still 36. Still 36 serves to free "Selecto" of water and the small amount of propane still remaining in it, propane passing off through pipe 47, water through 48, and "Selecto" passing through pipe 49 to tank 12 to begin its cycle. Propane, collected from its sources within the system by pipes 50–53 inclusive, returns through pipe 54 to storage tank setup 18 to begin its cycle. The extractors are operated under temperatures near atmospheric at such pressure that propane at those temperatures is liquid. Stills 23 and 37 are operated under pressures of about the same magnitude, though lower, and propane in pipes 50–53, after cooling, is liquid and goes direct to pipe 54. Stills 24 and 39 are operated at lower pressure and still 36 at even lower pressure, so propane from still 36, in line 47 passes through the low side of a two-stage compressor 55, and joins propane from pipe 51 in passing through the high side of that compressor before entering pipe 54, all being raised thereby to an appropriate pressure. Heaters, coolers, heat exchangers, and pumps not specifically mentioned above are inserted at appropriate points in the system.

Such a system, operating at temperatures near atmospheric, under pressures in the neighborhood of 250–300 pounds per square inch, upon Mid-Continent crude residue, using 3.0 to 3.5 parts "Selecto" per part of charge oil and 3.75 to 3.25 parts propane per part of charge oil, will commonly produce from a residue having a viscosity gravity constant (V. G. C.) of about .850 approximately 77% of a paraffinic fraction having a V. G. C. of about .800 and about 23% of a naphthenic fraction having a specific gravity of about 1.00. The paraffinic fraction is the desired fraction and may be raised in quality by more rigorous treatment with corresponding increase in per cent rejected. In such operation, the raffinate phase leaving the extractors through pipe 21 is composed of about 80% propane, 12% "Selecto", and 8% oil while the extract phase leaving the extractors through pipe 22 is composed of about 65% "Selecto", 18% propane, and 17% oil.

In the drawing, vapors from still 36, withdrawn from the system at water trap 48 comprise the mixture of water and "Selecto" referred to previously as a desirable additional reagent to be introduced with the oil to be treated to effect more complete separation of paraffinic oils from extract phase in stages C, B, and A. To effect the use of this reagent, a pipe 56 is used, with pump 57, and control valve 58, whereby desirable amounts of this reagent may be admixed with the oil to be treated prior to its entry to mixer 7.

In the practice of this invention, the amount of water reagent added may conveniently be from about ½ of 1% (0.5%) to about 5% of the oil to be treated.

It is understood that the examples and numerical data herein given are set forth by way of illustration only, and that the invention is not limited thereto or thereby, but is subject only to such limitations as are expressed in the following claims.

I claim:—

1. A method for the solvent refining of oils to lower their viscosity gravity constant, comprising the following steps: Flowing a naphthenic solvent and a paraffinic solvent countercurrently through a series of treating stages each including a mixing and a settling step, introducing oil to be treated at some intermediate stage of the series, removing from one end of the series a raffinate phase comprising oil, paraffinic solvent, and some naphthenic solvent, removing from the other end an extract phase comprising oil, naphthenic solvent, and some paraffinic solvent, separately recovering solvents from the two phases, collecting the naphthenic solvent, dehydrating the naphthenic solvent by distilling therefrom a mixture of water and naphthenic solvent of substantially constant proportions, and introducing a small amount of said aqueous distillate mixture sufficient in amount to promote separation between raffinate and extract phases within the system to the oil to be treated just prior to its entry to the series of treating stages.

2. A method for the solvent refining of oils to lower their viscosity gravity constant, comprising the following steps: Flowing a naphthenic solvent and a paraffinic solvent countercurrently through a series of treating stages each including a mixing and a settling step, introducing oil to be treated at some intermediate stage of the series, removing from one end of the series a raffinate phase comprising oil, paraffinic solvent, and some naphthenic solvent, removing from the other end an extract phase comprising oil, naphthenic solvent, and some paraffinic solvent, and introducing to the system, in the same stage in which oil is introduced, a small amount, sufficient in amount to promote separation between raffinate and extract phases within the system, of a reagent consisting of water to which from 1 to 10% of the naphthenic solvent has been added.

3. A method for the solvent refining of oils to lower their viscosity gravity constant, comprising the following steps: Flowing a naphthenic solvent and a paraffinic solvent countercurrently through a series of treating stages each including a mixing and a settling step, introducing oil to be treated at some intermediate stage of the series, removing from one end of the series a raffinate phase comprising oil, paraffinic solvent, and some naphthenic solvent, removing from the other end an extract phase comprising oil, naphthenic solvent, and some paraffinic solvent, separately recovering solvents from the two phases, collecting the naphthenic solvent, dehydrating the naphthenic solvent by distilling therefrom a mixture of water and naphthenic solvent of substantially constant proportions, and introducing from ½% to about 5% of said distillate mixture to the oil to be treated just prior to its entry to the series of treating stages.

4. A method for the solvent refining of oils to lower their viscosity gravity constant, comprising the following steps: Flowing a naphthenic solvent and a paraffinic solvent countercurrently through a series of treating stages each including a mixing and a settling step, introducing oil to be treated at some intermediate stage of the series, removing from one end of the series a raffinate phase comprising oil, paraffinic solvent, and some naphthenic solvent, removing from the other end an extract phase comprising oil, naphthenic solvent, and some paraffinic solvent, separately recovering solvents from the two phases, collecting the naphthenic solvent, dehydrating the naphthenic solvent by distilling therefrom a mixture of water and naphthenic solvent of substantially constant proportions containing about 6% of naphthenic solvent, and introducing a small amount of said distillate mixture to the oil to be treated just prior to its entry to the series of treating stages.

HENRY D. NOLL.